(12) United States Patent
Marocchini et al.

(10) Patent No.: US 9,638,518 B2
(45) Date of Patent: May 2, 2017

(54) POSITION SENSING DEVICE WITH ROTARY TO LINEAR MAGNIFICATION

(71) Applicant: Hamilton Sundstrand Corporation, Charlotte, NC (US)

(72) Inventors: Francis P. Marocchini, Somers, CT (US); Gregory DiVincenzo, Wethersfield, CT (US); Mike R. Lyon, South Windsor, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 314 days.

(21) Appl. No.: 14/504,547

(22) Filed: Oct. 2, 2014

(65) Prior Publication Data

US 2016/0097636 A1 Apr. 7, 2016

(51) Int. Cl.
*G01M 15/00* (2006.01)
*G01B 21/22* (2006.01)
*G01M 15/14* (2006.01)

(52) U.S. Cl.
CPC ............. *G01B 21/22* (2013.01); *G01M 15/14* (2013.01)

(58) Field of Classification Search
CPC ................................ G01B 21/22; G01M 15/14
See application file for complete search history.

(56) References Cited

U.S. PATENT DOCUMENTS 3,981,140 A * 9/1976 Lunsford .................. F02C 9/22
415/149.1
4,146,967 A * 4/1979 Rohner ................. G01B 5/0002
33/530
7,207,777 B2 * 4/2007 Bervang ................. B66C 1/108
416/119
7,934,585 B2 * 5/2011 Iversen ................... F03D 1/003
182/142
8,281,442 B2 * 10/2012 Eggleston ................. B08B 1/02
15/21.1

(Continued)

FOREIGN PATENT DOCUMENTS

DE 2643607 9/1977

OTHER PUBLICATIONS

Essing (English Translation of German Patent Application Publication DE 2643607).*

(Continued)

*Primary Examiner* — Harshad R Patel
*Assistant Examiner* — Samir M Shah
(74) *Attorney, Agent, or Firm* — Cantor Colburn LLP

(57) ABSTRACT

A device and method for measuring the rotational position of a rotating feature, the device employing rotary to linear magnification. A connecting member is operatively connected to the rotating feature, the connecting member extending through one or more structural layers of an enclosure. An arm is operatively connected to the connecting member and located outside the enclosure. A target is arranged with respect to a position sensor, with the position sensor configured to measure the linear position of the target with respect to the position sensor. A cable is connected to the arm at an attachment point, the cable also being connected to the target. One or more pulleys are arranged to control the path of the cable between the attachment point on the arm and the target.

13 Claims, 4 Drawing Sheets

(56) References Cited

U.S. PATENT DOCUMENTS

| | | | | |
|---|---|---|---|---|
| 8,641,374 B2* | 2/2014 | Byreddy | ............... | B08B 1/00 |
| | | | | 415/232 |
| 2005/0042102 A1* | 2/2005 | Teichert | ............... | B08B 1/04 |
| | | | | 416/146 R |
| 2006/0175465 A1* | 8/2006 | Teichert | ............... | B66C 23/207 |
| | | | | 244/33 |
| 2006/0237565 A1* | 10/2006 | Barker | ............... | A01K 89/0114 |
| | | | | 242/229 |
| 2007/0056801 A1* | 3/2007 | Iversen | ............... | F03D 1/003 |
| | | | | 182/141 |
| 2010/0132137 A1* | 6/2010 | Eggleston | ............... | B08B 1/02 |
| | | | | 15/21.1 |
| 2011/0103933 A1* | 5/2011 | Olesen | ............... | F03D 17/00 |
| | | | | 415/118 |
| 2012/0325581 A1* | 12/2012 | Gunther | ............... | F03D 1/003 |
| | | | | 182/129 |
| 2013/0300855 A1* | 11/2013 | Fritz | ............... | G01N 21/954 |
| | | | | 348/82 |

OTHER PUBLICATIONS

International Search Report, International Application No. GB1513671.6, Date of Mailing Apr. 4, 2016, United Kingdom Intellectual Property Office; International Search Report, 8 pages.

* cited by examiner

POSITION SENSING DEVICE WITH ROTARY TO LINEAR MAGNIFICATION

STATEMENT REGARDING FEDERALLY SPONSORED RESEARCH OR DEVELOPMENT

This invention was made with Government support with the United States Navy under Contract No. N00014-09-D-0821. The Government therefore has certain rights in this invention.

BACKGROUND

The present disclosure relates generally to turbine engines and, more particularly, to a position monitoring system for rotating parts of a turbine engine such as, for example, as part of an aircraft.

A gas turbine engine may be used to power various types of vehicles and systems. A turbofan gas turbine engine may include, for example, a fan section, a compressor section, a combustor section, a turbine section, and an exhaust section. The fuel efficiency of the engine may be optimized, in part, by controlling the airflow through the various sections of the engine, for example, as part of a Variable Area Turbine (VAT) with adaptive controls for a variable cycle engine. For example, a Full Authority Digital Engine Controller (FADEC) may be used to control the airflow through the engine, as well as other aspects of the engine function. The FADEC may be used to control the positioning of vanes, (i.e., angle), in any of the fan, compressor, or turbine sections. However, while systems are available for articulating the position of engine elements, such as vanes, there is currently no system for verifying the position of the vanes using a position sensor. Difficulties associated with locating a positioning sensor within the engine, particularly in the turbine section, include protecting the sensor from the internal environment of the engine and eliminating or reducing errors associated with the thermal expansion of various layers between the location of the vanes and the location of the position sensor equipment. Accordingly, the industry is receptive to engine control systems that provide accurate measurement of vane position.

SUMMARY OF THE INVENTION

Disclosed herein is a position sensing device for measuring the rotational position of a rotating feature arranged in a harmful environment. A connecting member is operatively connected to the rotating feature, the connecting member extending through one or more structural layers of an enclosure. An arm is operatively connected to the connecting member and located outside the enclosure. A target is arranged with respect to a position sensor, with the position sensor configured to measure the linear position of the target with respect to the position sensor. A cable is connected to the arm at an attachment point, the cable also being connected to the target. One or more pulleys are arranged to control the path of the cable between the attachment point on the arm and the target.

Another aspect of the disclosure provides a method of measuring the rotational position of a rotating feature arranged in a harmful environment. The connecting member is operatively connected to the rotating feature, with the connecting member arranged to rotate with the rotation of the connecting member, the connecting member being defined by a rotational axis. A portion of the connecting member is arranged within the harmful environment. An arm is arranged in connection with the connecting member, the arm extending perpendicular from the rotational axis. A target is connected to the arm with a cable, the target being arranged adjacent to a position sensor configured to measure the linear displacement of the target.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures. It is to be understood that other embodiments may be utilized and changes may be made without departing from the scope of the present disclosure. In particular, the disclosure provides various examples related to turbofan engines for aircraft, whereas the advantages of the present disclosure as applied in a related field would be apparent to one having ordinary skill in the art and are considered to be within the scope of the present invention.

Figure 1:
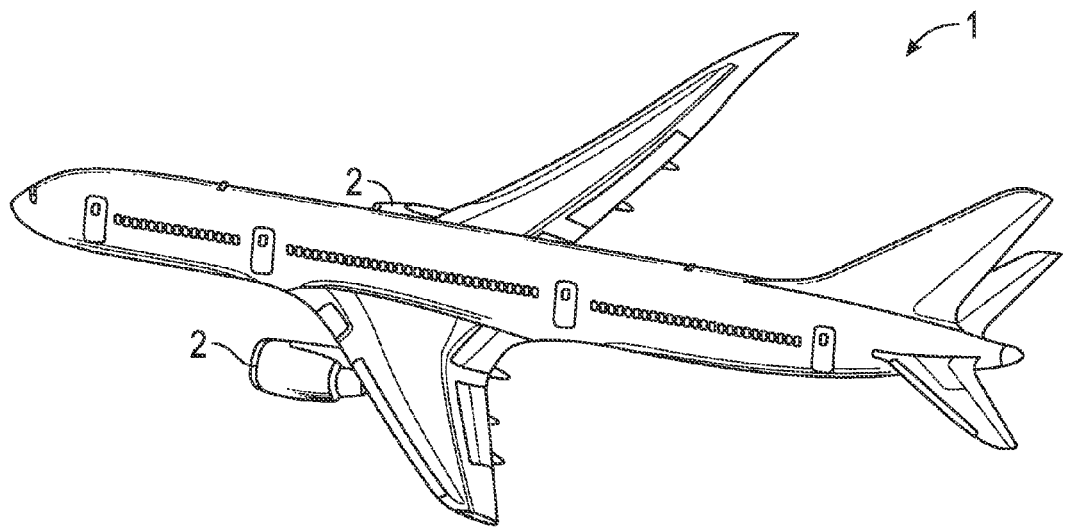
FIG. 1 is an aircraft employing one embodiment.

FIG. 1 illustrates an example commercial aircraft 1 having aircraft engines 2 (e.g., turbofan engines) that may embody aspects of the teachings of this disclosure. In particular, the engine 2 employs an engine control system that employs a position sensor with rotary to linear magnification. The position sensor of the present disclosure measures vane movement within the engine by use of a sensor and target that uses rotary to linear magnification to amplify the input motion. Because of hardware tolerance stack and thermal effects, small movements within the system can result in unacceptable errors, as measured by the ratio of variation to total stroke. As discussed below, these errors are minimized by comparison by amplifying the input motion.

Figure 2:
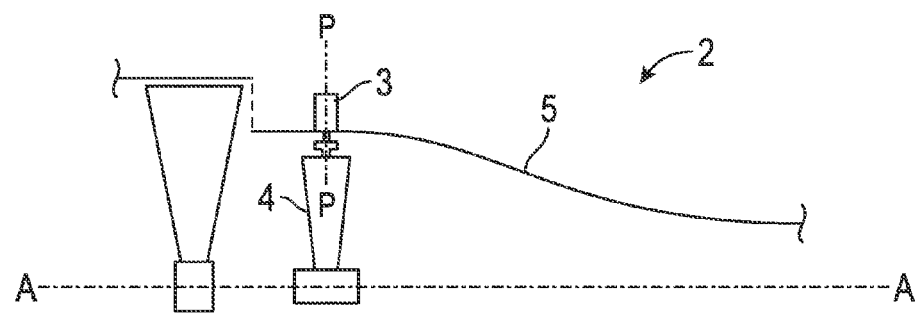
FIG. 2 is a cross-sectional view of an aircraft engine according to one embodiment.

FIG. 2 shows a sectioned side view of an engine 2 that employs a position sensing device 3 in accordance with the present disclosure. The position sensing device 3 measures the rotational position of a rotating feature 4 about a positioning axis P. The engine 2 comprises an enclosure 5 that contains a harmful environment, i.e., a high-temperature and/or high-pressure environment. With reference to the engine 2, the harmful environment may be in the compressor, turbine, or other section of a turbofan engine or other harmful environment with a rotating feature. The rotating feature 4 may be, for example, a vane or a connecting feature that mechanically links the rotation of a plurality of vanes. Each of the plurality of vanes may be associated with a distinct positioning axis P, that may be radially or otherwise related to the positioning axis P shown in the illustration.

The rotating feature 4 may also rotate about a central axis A, in which case the positioning axis P may change relative position over time.

Figure 3:
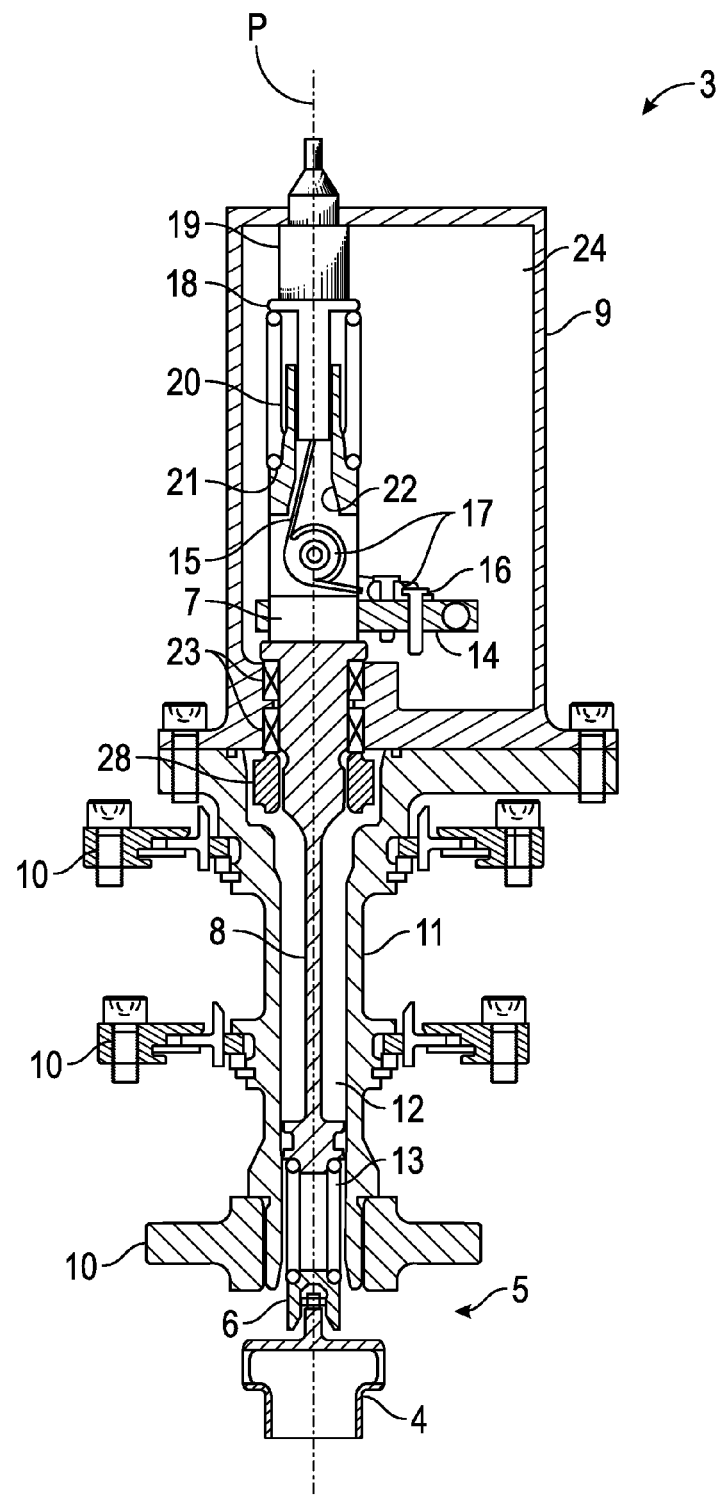
FIG. 3 is a cross-sectional view of a position sensing device of the present disclosure according to another embodiment.

FIG. 3 shows position sensing device 3 according to one example of the present disclosure, comprising a rotary connector 6 that may be connected to the rotating feature 4 within the enclosure 5. The rotary connector 6 is connected to a disk 7 by a connecting member 8. The disk 7 is contained within a housing 9 that is separated from the enclosure 5. The connecting member 8 extends through one or more structural layers 10 that form various aspects of the enclosure 5. The connecting member 8 may extend through a sleeve 11 that penetrates the structural layers 10 and forms a channel 12. In the example illustrated by FIG. 3, the connecting member is attached to the rotary connector 6 by a connector biasing member 13. The connector biasing member 13 serves as a suspension for the rotating feature 4, which absorbs the thermal expansion of the rotating feature 4 in the harmful environment of the enclosure 5 and other forces that may be acting on the rotating feature 5.

Also shown in FIG. 3, the disk 7 is connected to an arm 14 that serves to amplify the rotational motion. A cable 15 is connected to the arm at an attachment point 16 at a predetermined distance D from the positioning axis P. The attachment point 16 may comprise a pin or other fastener. The cable 15, in turn extends around one or more pulleys 17 to a target 18. The target 18 is arranged adjacent to a sensor 19 that measures the translational position of the target.

In the example shown in FIG. 3, the target 18 is biased towards the sensor 19 by a target biasing member 20. The target biasing member 20, which may be a helical spring, is arranged between the target 19 and a shoulder 21. The shoulder 21 is arranged at a fixed distance from the sensor 19 to provide consistent measurements. The shoulder 21 may, for example, be operatively connected to the disk 7, as shown. The shoulder 21 may also be formed on a guide 22 that constrains the path of the cable 15 to where it connects to the target 18. One or more bearings 23 may be placed along the connecting member 8, such as where it enters the housing 9, to enable the rotation of the connecting member 8 and constrains the connecting member 8, from axial motion.

Referring again to FIG. 3, the sensor 19, target 18, cable 15, pulleys 17, arm 14, disk 7, and associated features are shown arranged within the housing 9. The housing 9 may comprise a single chamber 24, as shown in FIG. 3, or may be divided into separate chambers and structures. Further, while FIG. 3 shows the target 18 and sensor 19 aligned with the positioning axis P, this alignment is not necessary. For example, the position sensing device 3 may comprise a single pulley 17, with the target 18, guide 22, target biasing member 20, and sensor 19 arranged horizontally with respect to the view of FIG. 3. Other configurations are also possible, as will be apparent to those with skill in the art.

Figure 4A:
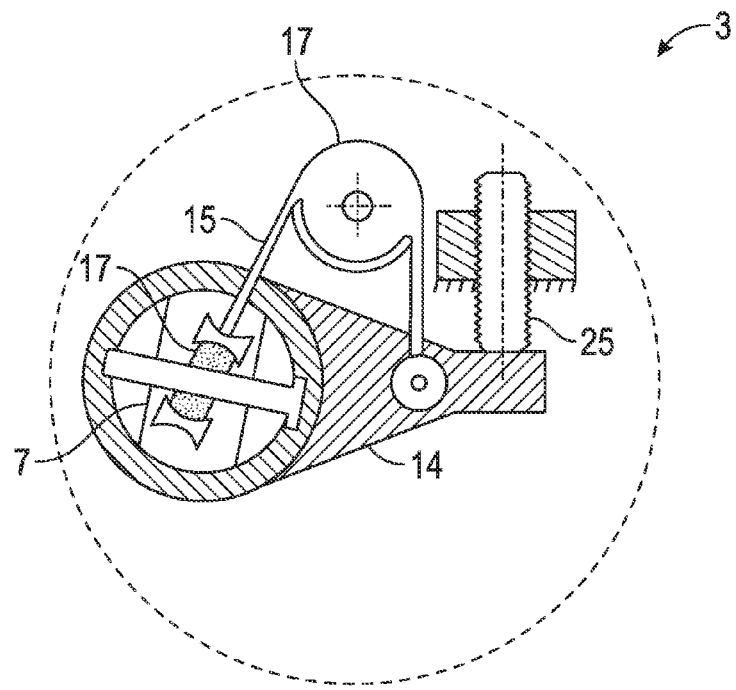
FIGS. 4A and 4B are cross-sectional views of the position sensing device of FIG. 3 along section line A-A, in two different positions during the operation of the position sensing device.
Figure 4B:
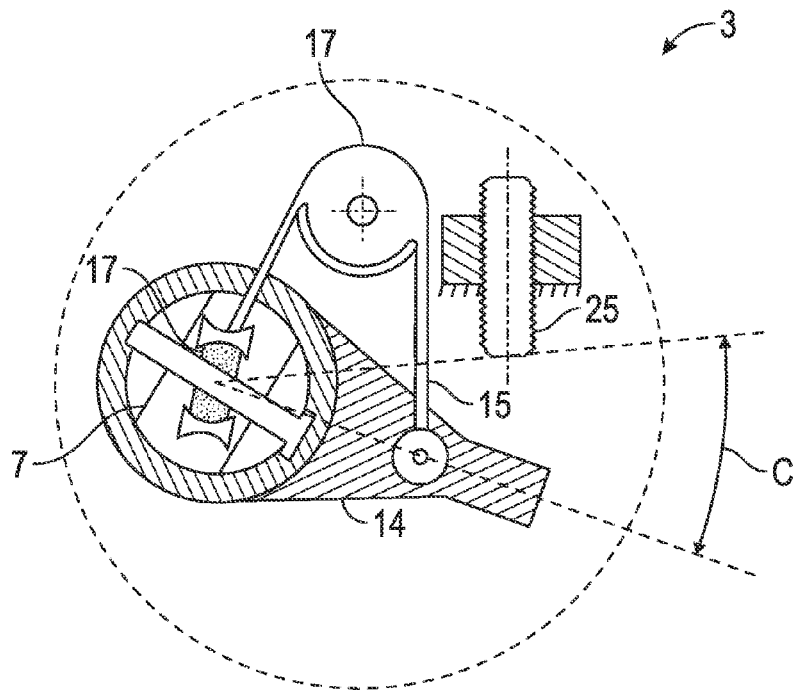

FIGS. 4A and 4B show a partially sectioned view of the position sensing device 3 along section line A-A of FIG. 3. FIG. 4A shows a position of the disk 7 and arm 14 relative to the position shown in FIG. 3, where the target 18 is contacting the sensor 19. The contact between the target 18 and the sensor 19 may be actual contact or may be at a small distance calibrated to maintain a minimal amount of separation between the target 18 and the sensor 19. Where the target 18 "contacts" the sensor 19, as shown in FIG. 3, the position of the arm 14 may be constrained by a stop 25. This position, where the arm 14 is constrained by the stop 25 and/or where the target 18 is in contact with the sensor 19 corresponds to one extreme of the range of rotational motion of the rotating feature 4 (shown in FIG. 3). FIG. 4B illustrates the positioning device 3 wherein the disk 7 and arm 14 are rotated to a position that is at an angle C from contact with the stop 25. Alternatively, the stop may be placed at an opposite extreme of the range of rotational motion of the rotating feature 4. In other examples, the positioning device 3 may comprise two stops 25, at each extreme of the range of rotational motion of the rotating feature 4.

Figure 5:
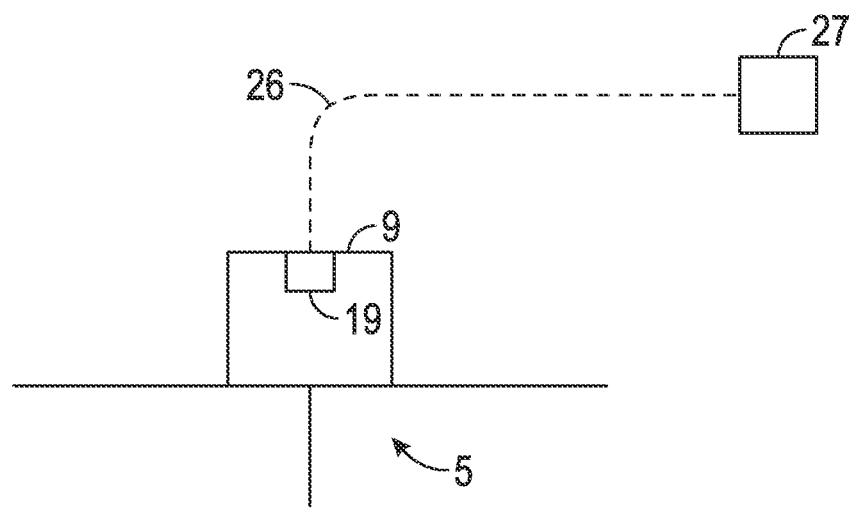
FIG. 5 is a schematic view of a position sensing system according to another embodiment.

FIG. 5 schematically shows features of a position sensing system and method according to the present disclosure. As noted above, the sensor 19 measures the distance between the sensor 19 and the target 18, which directly correspond to the length of the cable extended as the arm 14 changes angle C with the rotation of the disk 7. The sensor 19 then forms a signal corresponding to this distance, which signal is transmitted over communications link 26 to a processor 27. The communications link 26 may be a cable or a wireless transmitter and receiver or other communications device. The processor 27 then interprets the signal from the sensor 19 to determine the angle C, and therefore the angle of rotation of the rotating feature 4 (See FIGS. 2 and 3). The angle C corresponds to a length of the cable 15, (and therefore a distance between the target 18 and the sensor 19, shown in FIG. 3), that may be calculated trigonometrically, as a function of the distance D and the relative position of the one or more pulleys 17. The processor 27, or another processor, may then compare the measured rotational position of the rotating feature with an expected or desired position of the rotating feature at a given time. The processor may then form a corresponding command to correct the position of the rotating feature accordingly.

The device and system of the present disclosure may be used in a method for measuring the rotational position of a rotating feature arranged in a harmful environment. The connecting member is operatively connected to the rotating feature, with the connecting member arranged to rotate with the rotation of the connecting member, the connecting member being defined by a rotational axis. A portion of the connecting member is arranged within the harmful environment. An arm is arranged in connection with the connecting member, the arm extending perpendicular from the rotational axis. A target is connected to the arm with a cable, the target being arranged adjacent to a position sensor configured to measure the linear displacement of the target.

The method may further comprise forming a signal with the position sensor representing the linear displacement of the target. The signal is then transmitted to a processor, where the rotational position of the rotating feature is calculated from the signal. The processor may use the position calculated from the signal to reposition the rotating feature.

Referring again to FIG. 3, the rotational position of the rotating feature may be controlled using a Locking Ring 28. The Locking ring 28 may be connected to the rotating feature 4 to control the axial motion of the connecting member 8. The system and method described above may be used to position the rotating feature with increased accuracy, which necessarily enables an increase in fuel efficiency where used with an aircraft engine. Other advantages in similar applications will be apparent to those with skill in the art.

The device, system, and method of the present disclosure enable direct measurement of rotating features deep within an engine or other harmful environment, which provides accurate sensing and feedback for improved performance. The present disclosure allows multiple sensor types to be utilized in a linear/rotary configuration, as desired, to improve reliability and accuracy of signals from within the harmful environment. In addition, the position sensing device and system amplifies the input motion thereby reducing the ratio of variation to total stroke and thereby minimizes the percent error of the signal reading. Other benefits include allowing the selection of more inexpensive technology to accomplish these goals.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc., do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A position sensing device for measuring a rotational position of a rotating feature arranged in a harmful environment, comprising:
   a connecting member operatively connected to the rotating feature, the connecting member arranged to rotate with the rotation of the rotating feature, the connecting member extending through one or more structural layers of an enclosure, a portion of the connecting member arranged within the harmful environment,
   an amplifying arm operatively connected to the connecting member outside the enclosure to amplify rotational motion of the rotating feature,
   a position sensor and a target arranged with respect to the position sensor, the position sensor configured to measure the linear displacement of the target with respect to the position sensor;
   a cable connected to the amplifying arm at an attachment point, the cable also being connected to the target;
   one or more pulleys arranged to control the path of the cable between the attachment point on the amplifying arm and the target; and
   at least one stop positioned relative to the amplifying arm to constrain angular movement of the amplifying arm;
   wherein the rotational position of the rotating feature is calculated based on the measured linear displacement of the target.

2. The device of claim 1, further comprising a sleeve that encompasses the connecting member.

3. The device of claim 1, further comprising a target biasing element arranged to bias the target towards the position sensor.

4. The device of claim 1, wherein the connecting member is defined by a rotational axis, and wherein the amplifying arm is arranged perpendicular to the rotational axis.

5. The device of claim 4, wherein the attachment point is located at a selected distance from the rotational axis.

6. The device of claim 1, further comprising a housing for containing the amplifying arm, the target and the position sensor.

7. The device of claim 1, further comprising a communications link connecting the position sensor to a processor.

8. The device of claim 1, further comprising a connector biasing element arranged between the connecting member and the rotating feature.

9. The device of claim 1, wherein the one or more pulleys include at least two pulleys.

10. A method of measuring a rotational position of a rotating feature arranged in a harmful environment, comprising:
    operatively connecting a connecting member to the rotating feature, the connecting member arranged to rotate with the rotation of the rotating feature, a portion of the connecting member arranged within the harmful environment, the connecting member defined by a rotational axis;
    arranging an amplifying arm in operative connection with the connecting member to amplify rotational motion of the rotating feature, the amplifying arm extending perpendicular from the rotational axis;
    positioning a stop relative to the amplifying arm to constrain angular movement of the amplifying arm, and
    connecting a target to the amplifying arm with a cable, the target being arranged adjacent to a position sensor configured to measure the linear displacement of the target with respect to the position sensor;
    wherein the rotational position of the rotating feature is calculated based on the measured linear displacement of the target.

11. The method of claim 10, further comprising:
    forming a signal with the position sensor, the signal representing the linear displacement of the target;
    transmitting the signal to a processor; and
    calculating the rotational position of the rotating feature from the signal.

12. The method of claim 11, further comprising using the signal to reposition the rotating feature.

13. The method of claim 11, wherein connecting the target to the amplifying arm further comprises routing the cable through one or more pulleys.

* * * * *